No. 813,955.   PATENTED FEB. 27, 1906.
W. DEAN.
COFFEE COOLER AND STONER.
APPLICATION FILED MAR. 28, 1905.

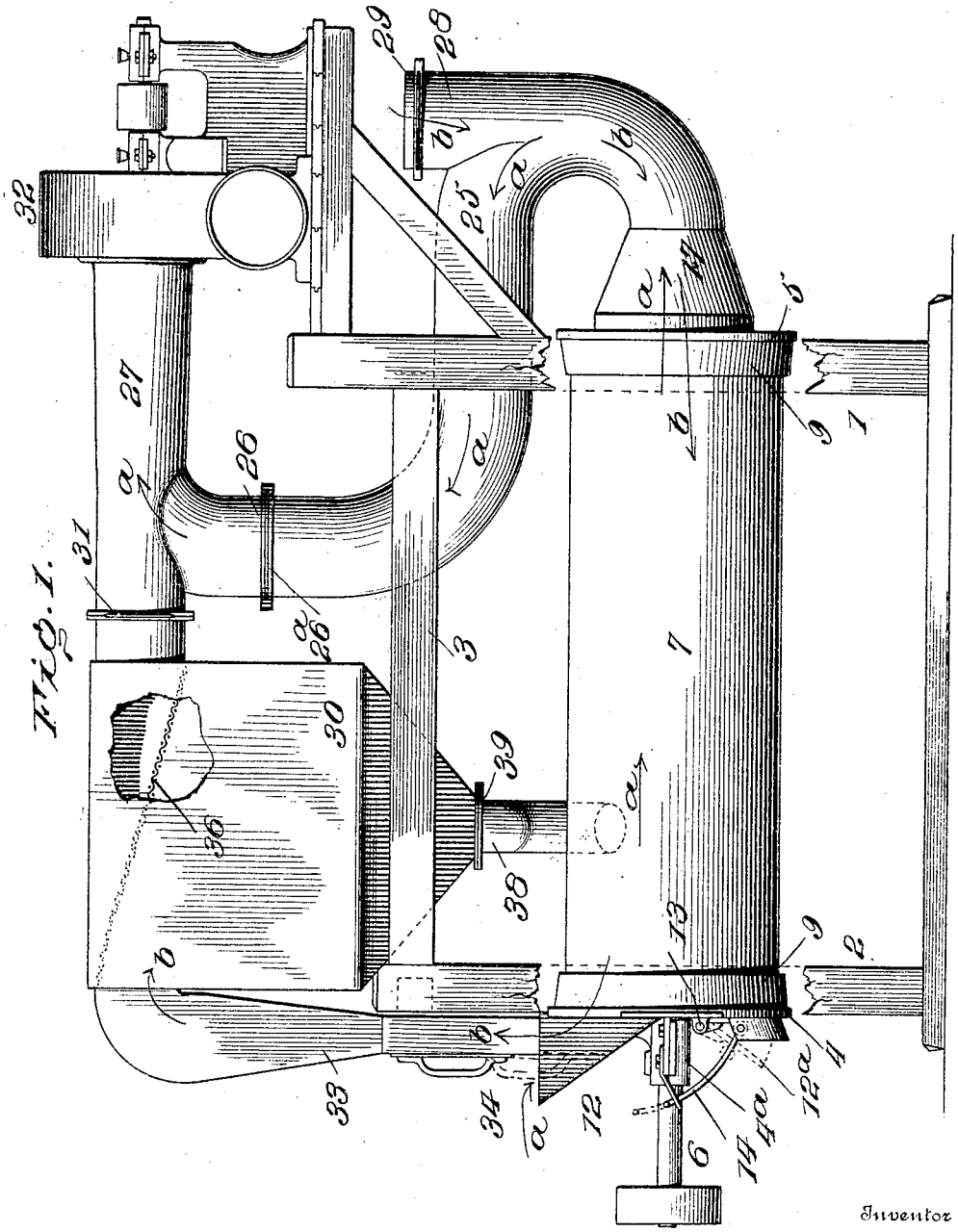

2 SHEETS—SHEET 2.

UNITED STATES PATENT OFFICE.

WILLIAM DEAN, OF MEMPHIS, TENNESSEE.

COFFEE COOLER AND STONER.

No. 813,955.     Specification of Letters Patent.     Patented Feb. 27, 1906.

Application filed March 28, 1905. Serial No. 252,549.

*To all whom it may concern:*

Be it known that I, WILLIAM DEAN, a citizen of the United States, residing at Memphis, in the county of Shelby and State of Tennessee, have invented certain new and useful Improvements in Coffee Coolers and Stoners; and I do hereby declare the following to be a full, clear, and exact description of the invention, such as will enable others skilled in the art to which it appertains to make and use the same.

This invention relates to improvements in an apparatus for cooling and stoning coffee and the like.

The object of the invention is to provide a substantially closed revolving receptacle to receive the coffee, in combination with a system of pipes provided with valves and connected to a blower, whereby a current of air may be drawn through the receptacle in one direction to cool the material and by manipulating the valves the direction of the air-current may be reversed for the stoning operation.

The invention also comprehends improvements in the specific details of construction, the objects of which will be more fully described, and be particularly pointed out in the claims.

In the drawings, Figure 1 is a side elevation of my improved apparatus. Fig. 2 is an end view of the same. Fig. 3 is a vertical section of the coffee-receptacle. Fig. 4 is a cross-section of the same. Fig. 5 is a detail end elevation of one of the heads of the receptacles.

The numeral 1 indicates a frame comprising uprights 2 and connecting-bars 3.

Bolted to the end uprights 2 are heads 4 and 5, having bears $4^a$ and $5^b$, in which is mounted a shaft 6, supporting a cylindrical material receptacle 7. Projecting inwardly from each of the heads 4 and 5 is an annular flange 8, and against these flanges the ends of the receptacle 7 abut, and rings 9 9 overlap the joint between the receptacle ends and the flanges 8 to prevent the escape of the material and the air.

The head 4 is formed with two openings 10 and 11; the upper opening 10 communicating with a chute 12, while the opening 11 is provided with a door $12^a$, hinged at 13 and operated through the medium of an arm 14. Head 5 is formed with an opening 15, surrounded by a flange 16, to which is attached the enlarged end of a pipe 17.

The shaft 6 is provided with spiders 18 for supporting the receptacle 7, and on the outside of head 4 said shaft has mounted on it a band-pulley 19. To the inner side of the receptacle are secured two series of blades 20 and 21. Blades 20 lift the coffee from the bottom of the receptacle, and as the latter revolves the coffee falls by gravity, only to be picked up again and similarly treated by the next succeeding blades. The blades 20 may be oppositely inclined to more thoroughly agitate and spread the material, as will be understood. Blades 21 are spirally disposed and are located near one end of the receptacle and adjacent a screen 22. The tendency of the blades 20 and the draft is to gradually feed the coffee toward the right, and were it not for the blades 21 screen 22 would become choked; but by spirally arranging said blades the coffee is carried away from the screen, hence permitting the free and uninterrupted passage of air through the receptacle.

Pipe 17 is bent upon itself, as at 25, and then vertical, as at 26, and there provided with a valve $26^a$, beyond which it communicates with a horizontal pipe 27, and between the points 17 and 25 is an extension 28, in which is a valve 29. Pipe 27 is connected at one end to a hopper 30, and between the hopper and the vertical portion 26 of pipe 17 is a valve 31, and the other end of said pipe 27 is connected to a suction-blower 32 of usual type, the blower being mounted on a platform projected from frame 1.

Connected to the opposite side of the hopper is a duct 33, which extends down and within the chute 12. Duct 33 is provided with a damper 34 where it enters chute 12 and is adapted to be moved down within said chute to cut off the passage of air when desired. Hopper 30 has a screen 36 arranged to extend from a point below pipe 27 to a point above the duct 33, and extending downwardly from the hopper is an exit-pipe 38, having a valve 39.

In operation valves 29 and 31 are closed, valve 34 is opened, and coffee or the like is introduced to receptacle 7 through chute 12, the suction-blower in the meantime being operated to create a current of air through the chute and the receptacle, as indicated by the arrows *a*. As soon as the coffee reaches the receptacle it commences to be agitated, blades 20 first lifting it and letting it drop, then blades 21 lifting and turning it back. While the coffee is being constantly agitated, a constant stream of fresh air is being drawn through the receptacle, and as the latter is substantially closed the force of draft against the moving grains of coffee soon cools them, and, as before explained, the coffee cannot choke the screen and retard the process of cooling. While the cooling operation is going on the tendency of the draft is to draw foreign substances to the blower, but such substances encounter the screen 22 and are stopped.

The cooling of the coffee having been effected and the operator desires to remove it for another charge or for stoning, valve 34 is closed to prevent air escaping through chute 12, and damper 26$^a$ is closed to cut off communication between pipes 27 and 17 and dampers 29 and 31 are opened. This arrangement of dampers reverses the draft, as shown by the arrows $b$, air being admitted through extension 28 and is sucked through receptacle 7, out chute 12 into duct 33, thence through hopper 30 to pipe 27, and finally through the blower-casing to the atmosphere. The draft in this instance draws the coffee from the receptacle through the duct and into the hopper 30, the screen 36 preventing it passing to the blower, the stones, nails, or other refuse matter remaining in the receptacle. The now cooled coffee may be drawn from the hopper 30 by opening valve 39, and the nails, stones, or other foreign substance too heavy to be blown from the receptacle by the draft is drawn off through the opening 11, after which the valves are readjusted, and the apparatus is again in condition to receive another charge of coffee.

I have found that by introducing the coffee to a revolving receptacle provided with agitating means and then creating a forced draft through the agitated coffee the latter is cooled in a comparatively short space of time, and by arranging the various pipes and valves whereby the current of air may be reversed for removing the coffee and at the same time stoning it considerable time and labor are saved.

The advantages of the invention are numerous and will be thoroughly appreciated by those skilled in the art to which it appertains, and as machines have heretofore been constructed for a like purpose it is not deemed necessary to dwell further on the operation.

What I claim as new is—

1. An apparatus of the class described, comprising a substantially imperforate revolving receptacle provided internally with agitators, means for revolving the receptacle, a blower, pipes connecting both ends of the receptacle with the blower, and valves in the pipes, whereby the draft may be directed longitudinally through the receptacle in line with the feeding of the material to cool the same, or the direction of the draft reversed to discharge the material from the receptacle and separate foreign matter therefrom.

2. An apparatus of the class described comprising a substantially imperforate revolving receptacle, having stationary heads to close the ends thereof, each head having an opening, a pipe communicating with the opening in one of the heads, valves in the pipe, a blower connected to the pipe, a hopper connected to the pipe, a duct connecting the hopper and the opening in the second-mentioned head, whereby the draft created by the blower may be passed through the revolving receptacle in either direction, and means for revolving the receptacle.

3. An apparatus of the class described, comprising a substantially closed revolving receptacle mounted on a revolving shaft, means revolving the shaft, agitating means in the receptacle, stationary heads at the ends of the receptacle, a chute communicating with an opening in one of said heads, a door in said head, a pipe communicating with the other head and connected to a blower, a blower, a duct communicating with the chute, a receiving-hopper and means for directing air from the blower longitudinally through the receptacle to cool the material therein, or in reverse direction to eject the material therefrom into the receiving-hopper.

4. An apparatus of the class described, comprising a horizontal revolving shaft, a substantially imperforate revolving receptacle mounted on the shaft, a screen at or near one end of the receptacle; a pipe communicating with one end of the receptacle, a duct communicating with the opposite end of the receptacle, a hopper interposed between the duct and the pipe, a blower, and a system of valves for directing draft longitudinally through the receptacle toward the screen for cooling the material being treated, and reversing the direction of the draft to eject the material from the receptacle into the hopper.

5. An apparatus of the class described comprising a revolving receptacle having two sets of agitating means therein, one of said sets of agitators positioned to lift the material and drop the same in substantially the same plane, the second set of agitators elevating the material and changing the direction of the same, a screen adjacent the second set of agitators, means for directing a draft of air through the receptacle, and means for changing the direction of the air and passing it through the receptacle in a reverse direction.

6. An apparatus of the class described comprising a revolving receptacle provided with a screen at or near one end, inclined agitators which elevate the material and deflect the same away from the screen, means for creating a draft in the receptacle, and means for changing the direction of the draft.

7. An apparatus of the class described, comprising a substantially closed receptacle provided with a screen, agitators located adjacent the screen and positioned to deflect material therefrom, a pipe connected to one end of the receptacle, a blower connected to the pipe, a duct communicating with the opposite end of the receptacle, a hopper communicating with the duct and the pipe, a screen interposed between the open ends of the duct and the pipe in the hopper, and means for altering the direction of the draft of air in the receptacle.

8. An apparatus of the class described comprising a substantially closed receptacle having stationary heads, a chute communicating with one head, a duct communicating with the chute, a valve closing the chute from the atmosphere, a hopper connected to the opposite end of the duct, a pipe communicating with the other end of the receptacle, said pipe communicating with the hopper and a blower, a blower, valves in the pipe, said valves coöperating with the valve in the duct to alter the direction of the draft in the receptacle, and means for gaining access to the receptacle.

9. An apparatus of the class described comprising a revolving receptacle, agitators in the receptacle, a screen in the receptacle, other agitators positioned adjacent the screen to deflect material therefrom, a duct communicating with one end of the receptacle and provided with a valve, a hopper communicating with the duct, a pipe communicating with the opposite end of the receptacle, two valves in the pipe, one of which closes the pipe against admission of air direct from the atmosphere, a branch pipe communicating with the first-mentioned pipe and the hopper, a valve in the branch pipe between the first-mentioned pipe and the hopper, a blower connected to the branch pipe, a screen in the hopper between the opening of the branch pipe and the duct, the valves serving to direct air through the receptacle in either direction.

10. An apparatus of the class described comprising a horizontal shaft, a revolving receptacle mounted on the shaft and provided at or near one end with a screen, inclined agitators mounted on the interior of the receptacle to elevate the material and deflect the same away from the screen, and means for creating a draft in the receptacle.

11. An apparatus of the class described, comprising a revolving receptacle provided with two sets of agitators, and a screen, one of said sets of agitators being positioned to lift the material and drop it in substantially the same plane, the other set of agitators being inclined and positioned adjacent the screen, a chute for supplying the receptacle with material, a hopper connected with a blower, a blower, a connection between the hopper and the receptacle, a connection between the receptacle and the blower, and a system of valves whereby the air and material may be directed toward the screen, or the air-current reversed to clean the receptacle.

12. In an apparatus of the class described, comprising a receptacle, a hopper, a blower, a pipe between the hopper and blower, a pipe connecting the pipe between the blower and hopper and the receptacle, an exit formed in said latter pipe, a pipe connecting the other end of the hopper and the opposite end of the receptacle, a screen in the hopper between the pipes communicating therewith, and a system of valves for directing the air from the blower through the receptacle in either direction.

In testimony whereof I have signed my name to this specification in the presence of two subscribing witnesses.

WM. DEAN.

Witnesses:
GEORGE RANDOLPH,
GERTRUDE COLBERT.